WOOD & SMITH.
Machine for Making Carriage Bolts.
No. 45,367.
Patented Dec. 6, 1864.
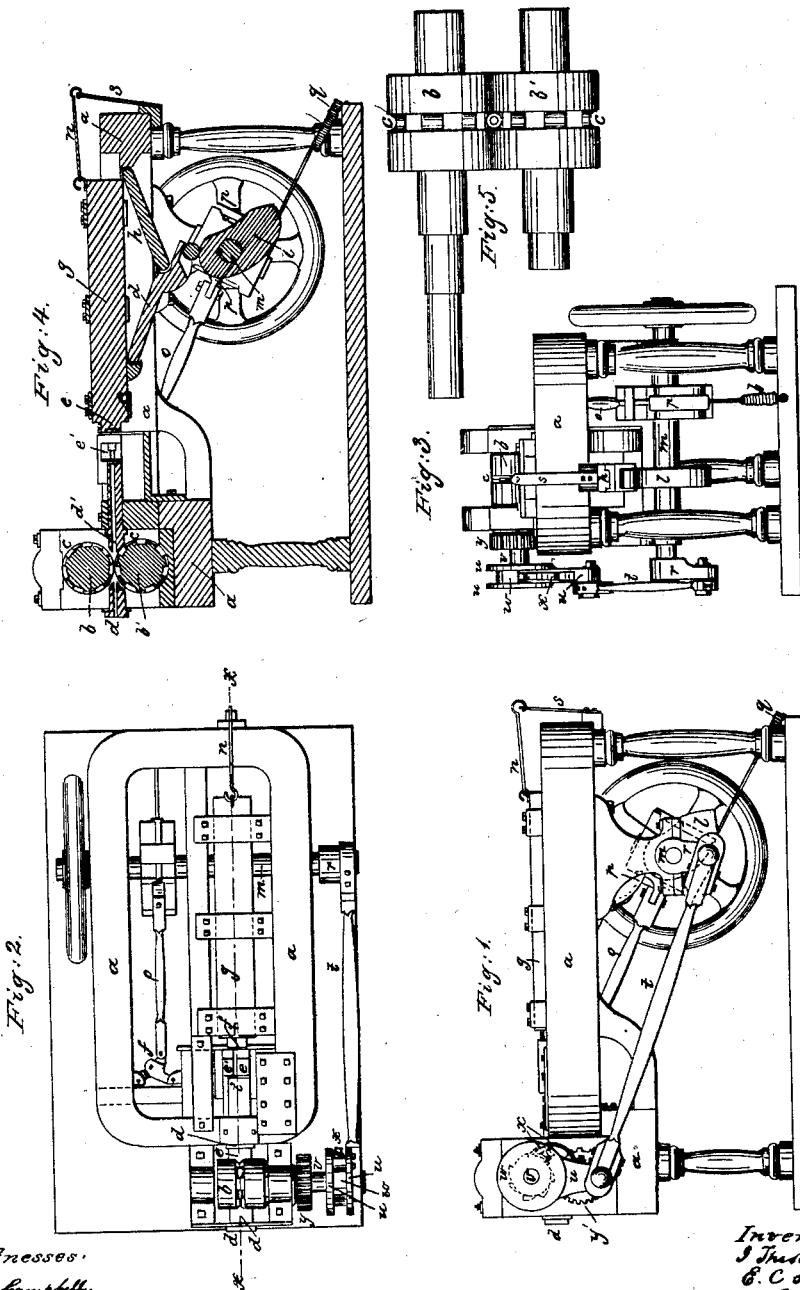

UNITED STATES PATENT OFFICE.

J. THEODORE WOOD AND EDWARD CONE SMITH, OF PITTSBURG, PA.

MACHINE FOR MAKING CARRIAGE-BOLTS.

Specification forming part of Letters Patent No. 45,367, dated December 6, 1864.

*To all whom it may concern:*

Be it known that we, J. THEODORE WOOD and EDWARD CONE SMITH, of the city of Pittsburg, in the county of Allegheny and State of Pennsylvania, have invented a new and useful Improvement in Machines for Making Turned-Head or Carriage Bolts; and we do hereby declare the following to be a full, clear, and exact description thereof, reference being had to the annexed drawings, forming part of this specification, in which—

Figure 1 is a side elevation of our machine. Fig. 2 is a plan or top view. Fig. 3 is a view from the rear end. Fig. 4 is a longitudinal vertical section through $x \, x$, Fig. 2. Fig. 5 is an enlarged representation of a pair of rolls used in our machine.

In the several figures like letters of reference denote similar parts of our machine.

The kind of bolts which our machine is designed to make are called "turned-head or carriage bolts," having a round flat head, a square shoulder under the head, and a round shank below the shoulder. The process ordinarily employed for making such bolts is both tedious and expensive, owing to the difficulty of making a bolt, the shank of which is partly square and partly round, and having a round flattened head. A head of the required shape is first made on the end of the rod of iron, the rod is then cut off the proper length and inserted in a machine by which the round shank and squared shoulder are formed; thus each bolt has to be separately passed into the machine after it has been headed and severed from the rod of iron. By our improvements we are enabled to manufacture such bolts more rapidly and to make a superior article, the bolt being made and headed in one machine, and requiring no handling from the time the rod is fed into the machine until it is delivered in a finished state.

To enable others skilled in the art to construct and use our improved machine, we will proceed to explain its construction and operation.

In the drawings, $a \, a$ is the frame-work of the machine. At the front end of the machine is placed a pair of grooved rollers, $b \, b'$, which are geared together, so as to revolve with rolling contact. They are placed with their axes horizontal, as seen in Fig. 2, and are of exactly the same diameter. Each roller has a groove, $c$, around it, which is cut into its surface, the groove in both being exactly alike, so that when the rollers are in operation the grooves will coincide. These grooves are so formed as to shape the rod of iron, which is square, before being inserted in the machine, alternately square and oval, or square and round, as may be preferred, the rollers shown in Fig. 5 being of the latter description, and are used when the square iron rod is fed into the machine with one of its plane sides horizontal, the other variety of rollers being used when the iron rod is fed in with its square sides at an angle of forty-five degrees to the horizon. The grooves in the rollers form the oval or round portion of the iron of the length of the round shank of the bolt, and leave the square portion long enough to form the head of the bolt, as well as the shoulder or square portion of the bolt between the head and round shank. The reason for making the grooves in one pair of rollers oval instead of round is so that the groove may be of uniform width or diameter at the face of the rolls in the oval as well as in the square portion. These rolls shape the bar into a succession of square and oval pieces, which are afterward cut into lengths for bolts by a cutter attached to the dies, as hereinafter explained. The grooved rollers have an intermittent motion communicated, as hereinafter described, remaining stationary while a bolt is being pressed and headed, and feeding the rod into the machine, and shaping it at the same time in the interval between the closing of the dies.

The square iron rod, first heated red-hot, is fed into the machine through a guide-box, $d$, placed in front of the grooved rollers, so as to guide the rod into the groove. The guide-box has a square cavity, and is set with its sides inclined at an angle of forty-five degrees to the bed-plate of the machine if the rolls with oval groove are used; but if the rolls with round groove are used it is set so that two sides of its cavity are horizontal. A similar guide-box, $d'$, is so placed on the rear of the rolls as to form a continuation of the guide-box $d$ in the same horizontal line, as shown in Fig. 4, so that the rod of iron, having passed through the rolls, is by their revolution fed forward through the rear guide-box, $d'$, to the dies $e\ e'$. One of the dies, $e$, is stationary in the machine, the other, $e'$, having having a lateral horizontal motion produced by the knuckle-joint $f$, which opens and closes it. These dies, when closed, have a cavity, one-half of which is in each die, the rear portion of which is square and the other portion is round. The axial line of this cavity is horizontal and coincident with the center of the cavity in the guide-box $d$, so that as the rod of iron is fed in by the rolls it enters the cavity of the dies. The intermittent motion of the rolls is so regulated, as hereinafter explained, as that the rolls cease to revolve as soon as the end of the rod has entered the cavity of the dies which open to receive it, the square part of the rod coinciding with the square portion of the dies, and the oval portion of the rod with the round part of the dies, and so much of the end of the rod extending beyond the rear end of the dies as to form the head. The die $e'$ then closes, pressing the shoulder and shank of the bolt, and at the same time a cutter, $i$, attached to the end of the moving die $e'$, cuts off the bolt from the rod.

A heading-tool, $f$, is fixed to the front end of a slide, $g$, which is moved horizontally forward toward the rear end of the closed dies $e\ e'$, and forms the head on the bolt against the end of the dies.

The forward motion of the heading-tool is effected by means of a knuckle-joint, one piece, $h$, of which is pivoted to the frame of the machine, and the other piece $k$ to the under side of the slide $g$, as seen in Fig. 3. The knuckle-joint is raised by means of a cam, $l$, fixed to the main shaft $m$ of the machine, and the heading-slide $g$ is drawn back suddenly as soon as the head is formed on the bolt by means of a spring, $s$, at the rear end of the machine, to which the slide $g$ is attached by a link, $n$.

The knuckle-joint $f$, by which the dies are opened and closed, is operated by a pitman, $o$, attached to a cam-yoke, $p$, which is operated by a cam on the main shaft $m$. The guides of the cam-yoke are placed on the shaft $m$, so that they will turn on it as a center, and thus allow of a direct connection (by a single pitman, $o$) of the cam-yoke $p$ with the knuckle-joint $f$. A spiral spring, $q$, serves to draw back the cam-yoke $p$ when the dies are to be opened, as it operates more rapidly and with less wear to the machinery than a return motion effected by the cam.

The construction and operation of the grooved rolls, the dies, and heading tool having been explained, it is necessary to explain how the intermittent motion of the grooved rolls is effected.

The main shaft $m$ of the machine revolves constantly on its axis. At one extremity of the shaft is a crank, $r$, connected by a pitman, $t$, to the crank $u$ at the extremity of the journal $v$ of the upper roll, $b$. In the head of the crank on the roll journal $v$ is a ratchet wheel, $w$, and a dog or pawl, $x$, attached to the side of the crank, rests against the ratchet-teeth. The ratchet-wheel $w$ is attached to the journal $v$ of the roll $b$, so that the roll turns when it is moved, but the head of the crank is loose on the journal $v$. The effect of this arrangement is that when the crank $r$ on the main shaft $m$ revolves it produces an oscillating or reciprocating motion of the crank $w$ on the shaft of the upper roll, $b$. When the crank $u$ is moved forward one stroke of the pitman $t$ or half-revolution of the shaft $m$, the pawl $x$ passes down over the face of one of the ratchet-teeth in the wheel $w$ until it drops under that tooth, and while this is being done the rolls $b\ b'$ remain stationary. As soon, however, as the pitman $t$ recedes and draws the crank $u$ backward, the ratchet-wheel $w$ turns and causes the upper roll, $b$, to make a partial revolution, and the rolls $b\ b'$, being geared together by the cog-wheels $y\ y'$, revolve at the same time. Thus the rolls $b\ b'$ make a partial revolution at each half-revolution of the shaft $m$, during which time the dies $e\ e'$ remain open, the heading-tool $g$ is drawn back, both remaining stationary, and on the other half-revolution of the shaft $m$ the rolls remain motionless, while the dies close and open again, and the heading-tool is pressed forward and then withdrawn. When the dies open after the header is withdrawn, the finished bolt drops out.

This machine requires no further attention than to feed the heated bars of iron into the guide-box $d$.

In order to adapt the machine to making bolts of different sizes, the rolls are changed, and the ratchet-wheel is removed and another substituted having as many teeth as there are square recesses in the groove of each roll. The dies also are changed to correspond with the size of the bolts to be made.

If it is preferred to make the shank of the bolt round in the rolls instead of making it oval at first and rounding it in the dies, a pair of rolls, such as are shown in Fig. 5, are used, and the guide-boxes $d\ d'$ are turned so as to allow the rod to be fed in with its flat side down, the only objection to this being that the "part" of the roll occurs in the middle of two opposite sides of the square shank instead of at the angle.

By our machine turned head-bolts with square shoulder and round shank can be made as rapidly as the iron can be fed in and the machine worked, and they need no second operation nor any handling until they are finished, which in so small an article is a matter of great importance, and greatly reduces the cost of manufacture.

We are aware that feed-rolls have been made for shaping and pointing spikes on the rod, and we do not claim, broadly, the use of feed-rolls operating to shape the metal passed between them; but in view of the practical difficulty of making bolts having a shank partly round and partly square, and to save multiplicity of operations, what we claim as our invention, and desire to secure by Letters Patent, is—

The use of feed-rolls so grooved as to form the round shank and square shoulder of carriage-bolts on the rod continuously before the blank is severed from the rod or the head formed thereon, in combination with suitable dies for pressing the shank and shoulder and severing the bolt from the rod, and a heading-tool for forming the head, constructed and arranged substantially as described.

In testimony whereof the said J. THEODORE WOOD and EDWARD CONE SMITH have hereunto set their hands.

JAMES T. WOOD.
E. C. SMITH.

In presence of—
JOHN M. NEAL,
A. S. NICHOLSON.